United States Patent [19]
Goel

[11] Patent Number: 4,728,384
[45] Date of Patent: Mar. 1, 1988

[54] TWO COMPONENT EPOXY STRUCTURAL ADHESIVES WITH IMPROVED FLEXIBILITY

[75] Inventor: Anil B. Goel, Worthington, Ohio

[73] Assignee: Ashland Oil, Inc., Ashland, Ky.

[21] Appl. No.: 877,600

[22] Filed: Jun. 23, 1986

[51] Int. Cl.$^4$ ............................................... C09J 5/02
[52] U.S. Cl. .................................. 156/307.3; 156/330; 428/414; 525/524; 528/103
[58] Field of Search ....................... 428/414; 528/103; 525/524; 156/307.3, 330

[56] References Cited

U.S. PATENT DOCUMENTS

| | | | |
|---|---|---|---|
| 3,075,932 | 1/1963 | Edwards et al. | 528/103 |
| 3,792,018 | 2/1974 | Logan | 528/103 |
| 3,904,813 | 9/1975 | Groff | 156/330 |
| 4,482,604 | 11/1984 | Donermeyer et al. | 428/414 |

FOREIGN PATENT DOCUMENTS 51-44560  11/1976  Japan .................................. 525/524

Primary Examiner—John J. Gallagher
Attorney, Agent, or Firm—John F. Jones

[57] ABSTRACT

The process for preparing an adhesive composition comprising mixing
(a) an epoxy resin component composed of an epoxy resin and the partial reaction product of a polyepoxide with a phenolic compound, with
(b) a hardener component composed of a primary and secondary amine containing polyamine or a poly amido-amine and a tertiary amine containing epoxy curing catalyst is described.

7 Claims, No Drawings

TWO COMPONENT EPOXY STRUCTURAL ADHESIVES WITH IMPROVED FLEXIBILITY

This invention relates to improved epoxy resin structural adhesives which result from the process of curing of a polyepoxide component with an amine hardener component in the presence of the partial reaction product of a diepoxide and a phenolic compound. The products of this process have improved flexibility and excellent adhesive performance, particularly with fiberglass reinforced sheet molding compound (SMC) substrates.

The use of active hydrogen compounds such as polyamines, polyacids, polymercaptans, polyphenols, etc. as curing agents for epoxide resins to give thermosetting polymers which have been used in adhesive applications is well known. Although the two component adhesive compositions (polyepoxide component and hardener or curing agent component) exhibit excellent adhesion properties, in most cases the cured products are rigid and the brittle with high modulus. The inclusion of flexibilizers such as urethane elastomers and butadiene rubber into epoxide adhesives of the prior art generally results in significant increases in viscosity of the individual components without any significant improvement of flexibility of the final cured polymer compositions. The use of plasticizers and low molecular weight monoepoxides generally tends to give products with inferior adhesion properties. Furthermore, the low molecular weight monoepoxides are usually much more toxic compared to the corresponding diepoxides.

I have discovered a process for providing significantly improved two component epoxide adhesive compositions composed of an epoxy resin component and a hardener component having much improved flexibility and excellent adhesive properties wherein there is included in the epoxy resin component a partial reaction product of a diepoxide and a phenolic compound.

Polymeric compositions based on the commercially available Bisphenol-A based epoxy resins cured by one or more of the active hydrogen compounds such as polyamines, polyacids, polyphenols, and the like exhibit good adhesion properties towards structural substrates including steel and thermoset plastics but most of these adhesives are rigid, stiff and brittle polymers and these deficiencies are considered to be responsible for undesirable read-through (deformation) particularly in substrates such as sheet molding compounds. This problem is also partly due to the shrinkage occurring in the epoxide adhesive during the curing, thus building undesired stress in the substrates as well as the adhesive at the glue line. Furthermore, prior art addition of flexibilizers such as butadiene rubbers, urethane elastomers, and the like generally results in significant increases in the viscosities of the components when used in large enough amounts to impart some flexibility. The use of plasticizers and monoepoxides which are more toxic usually causes poor adhesion. In addition to this, the epoxy adhesive compositions of the prior art usually lack one or more of the following desired features in high performance structural adhesives. The key desired features of two-component structural adhesives for many types of applications such as fiberglass reinforced plastics, automotive assembly parts and the like include:

Individual component processible viscosities.

Non-critical mix ratios, possibility of foolproof mixing of the two components (plus or minus 50% variation allowable).

Non-sagging character of the mixed adhesive before gelation occurs.

Reasonably long room temperature (applying temperature) open time (pot life) usually about 30 minutes or more.

Rapid curing (or gelling) upon heat (preferable at about 100° C.).

No need for rigorous surface preparation of the substrate (cleaning, scratching, scrubbing, priming, and the like).

High flexibility and tough adhesive bond with high shear and peel strengths at temperatures from about ambient to 200° F.

Low hygroscopicity of adhesive.

High heat resistance of the bond (400° F. for more than one hour).

I have found that the polymeric compositions obtained by the polymerization of the modified epoxy resins produced by the partial reaction of diepoxides with small amounts of phenol (0.02 to 0.4 equivalents of phenol per epoxide equivalent) with active hydrogen containing polyamines and amido-amines, are highly flexible and show excellent adhesive performance. The use of long chain amines containing poly(propylene oxide) groups in the chain and having molecular weights in the range of 400 to 10,000 further improves the flexibility of the polymer composition. In addition to this, small amounts of additional flexibilizing agents such as butadiene rubber, urethane elastomer and the like may also be included in the components. Furthermore, use of chain extender and chain termination reagents such as phenolics (phenol, Bisphenol-A and the like) may also be added to further flexibilize the system as well as to improve the epoxy polymerization rate.

The polyepoxides useful in this invention can be monomeric or polymeric, saturated or unsaturated, aliphatic, cycloaliphatic, aromatic or heterocyclic, and they may be substituted if desired with other substituents besides the epoxy groups, e.g., hydroxyl groups, ether radicals, halogen atoms, and the like.

Typical epoxy components suitable in the practice of this invention include those disclosed in U.S. Pat. Nos. 2,500,600 and 2,324,483 which are incorporated here by reference. Preferred in this invention are 1,2-epoxy compounds having an epoxide equivalence greater than 1, that is to say, compounds containing more than one group of the formula:

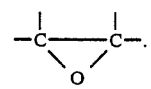

The 1,2-epoxide groups may be either terminal or inner ones. Particularly suitable terminal 1,2-epoxide groups are 1,2-epoxy ethyl or 1,2-epoxy propyl groups. The latter may be linked to an oxygen atom, that is to say, they are glycidyl ether or glycidyl ester groups. Compounds with inner epoxide groups usually contain the 1,2-epoxide group in an aliphatic chain or in a cycloaliphatic ring.

As epoxy compounds containing an inner 1,2-epoxy group there are suitable epoxidized diolefins, dienes, or cyclic dienes, such as 1,2,5,6-diepoxy hexane, 1,2,4,5-diepoxy cyclohexane, dicyclopentadiene diepoxide, dipentene diepoxide, vinyl cyclohexene diepoxide, epoxidized diolefinically unsaturated carboxylic acid esters, such as methyl 9, 10, 12, 13-diepoxy stearate or the dimethyl ester of 6,7,10,11-diepoxyhexadecane-1,16-dicarboxylic acid. Furthermore, there may be mentioned epoxidized mono-, di-, or polyesters, mono-, di-, or polyacetals containing at least one cycloaliphatic 5-membered or 6-membered ring, to which at least two 1,2-epoxidized groups are linked.

A widely used class of polyepoxides which can be used in the present invention are the epoxy polyethers obtained by reacting a halogen containing epoxide or dihalohydrin, such as epichlorohydrin, epibromohydrin, 3-chloro-1,2-epoxyoctane, and the like with either a polyhydric phenol or a polyhydric alcohol.

In order to build non-sagging character in the adhesive system of this invention, small amounts of polyisocyanates (0.5 to 5% by weight) may be included in the epoxy resin component which, upon mixing with the amine hardener component, provides the non-sagging property when it is desired.

In order to improve further the non-sagging behavior of the epoxy adhesive of this invention one can use small amounts of thixotropic agents such as fumed silica in the epoxy component which may also contain the regular fillers such as talc, alumina, kaolin, and the like. Thus, the two-component flexible epoxy adhesive embodied in this invention is composed of (1) an epoxy component containing a polyepoxide resin, a partial reaction product formed by the prereaction of a small amount of a phenol with a diepoxide or polyepoxides and optionally containing rubber modified epoxy resin and polyisocyanate for chemical thixotropy and (2) a hardener component composed of primary and secondary amine containing polyamines and poly amidoamines, along with tertiary amino group containing molecules known to act as epoxy curing catalysts. The amines include poly(propylene oxide) di- or tri-primary amine of molecular weights ranging from 200–10,000 and short amines such as ethylene diamine, amino ethyl piperazine and the like. The hardener component may also contain phenolics such as phenol, Bisphenol-A and the like in order to provide the curing rate acceleration as well as flexibilization of the polymer by chain extension and chain termination.

A large number of epoxy curing agents and catalysts are described in the prior art which may be used in the hardner component to achieve the desired room temperature long open time and fast curing at higher temperatures (about 100° C.). Some of the preferred catalysts are those containing tertiary amines such as tris(-dimethylaminomethyl) N, N', N''-tris(dimethylamino propyl) hexahydrotriazine, substituted piperazines and their derivatives and cationic catalysts such as Lewis acids complexed with bases such as boron trifluoride amine, alkali and alkaline earth metal cationic salts such as M(X) wherein M is lithium, magnesium, calcium and the like and X is $BF_3$, $PF_6$, $ClO_4$, $AsF_6$, iodonium or sulfonium salts and the like. The amount of these catalysts used may be in the range of from 1–10% by weight of the total hardener component. The amount of the long chain amines used may be in the range of from 30 to 70% by weight of the hardener component and the amount of phenolic chain extenders and chain terminators may be in the range of from 0 to 30% by weight. The hardener may contain fillers such as talc, alumina, kaolin, silica and the like in amounts of from 0 to 40% by weight. The adhesives of this invention when cured at temperatures in the range of from about 25° C. to 200° C. form bonds which are excellent in adhesion and tolerate thermal and mechanical stresses and shocks. They possess high lap shear strengths as well as excellent peel strengths.

This invention is further illustrated in the following representative examples.

EXAMPLE 1

The following general procedure was used for the preparation of adhesive bonds throughout the following Examples.

The two components, i.e., the epoxy resin component and the hardener component, were mixed in appropriate weight amounts under an inert atmosphere at room temperature. The resulting mixture was applied in the form of ⅜ inch beads across the substrate (sheet molding compound or SMC) which were panels measuring 12 inches by 4 inches by 100 mils (thickness) and a few 30 mils diameter glass beads were sprinkled on the top of the adhesive to give a final glue line thickness between substrates of 30 mils. The other laminate was placed on top of the one having the adhesive with a one inch overlap. The resulting sandwich samples were cured in a heated fixture at 230° F. under a pressure of one psi for 3–4 minutes. The resulting samples were then placed in an oven and postcured at 285° F. for 30 minutes. Test specimens were then cut from these cured samples (one inch strips for testing).

The test procedures were then carried out on the sample strips using a set of at least three duplicate samples for each type of test.

A. Shear strength test at room temperature.

B. Postbaking at 400° F. for an additional one hour and tested shear strength at room temperature.

C. Shear strength test at 180° F.

D. Shear strength test at 130° F. on samples after immersion for 7 days in 130° F. water.

E. Shear strength test at 180° F. after one hour post bake at 400° F.

Several commercially available sheet molding compound laminates were tested and the results obtained were found to be similar.

EXAMPLE 2

Three different levels of phenol were reacted with liquid diglycidyl ether of Bisphenol-A to obtain the modified epoxy resins for the flexible adhesive compositions.

A. To a reactor equipped with a mechanical stirrer, a thermometer with temperature controller and nitrogen inlet was charged 400 g of liquid diglycidyl ether of Bisphenol-A (epoxy equivalent weight of 180–190), 46.5 g of phenol and 0.5 g of triphenyl phosphine. The reaction mixture was heated at 120°–125° C. under nitrogen and mechanically stirred for approximately one hour. The resulting liquid was analyzed for unreacted phenol by GLC which showed no detectable phenol.

B. The process of Example 2A was followed using 200 g of the diepoxide resin, 50 g of phenol and 0.26 g of triphenyl phosphine. The reaction product obtained after 1½ hours of reaction at 125° C. when analyzed by GLC showed no detectable unreacted phenol.

C. The process of Example 2A was followed using 200 g of the diepoxide resin, 87 g of phenol and 0.29 g of triphenylphosphine. The reaction product obtained after 1½ hours when analyzed by GLC showed only traces (0.6%) of unreacted phenol.

EXAMPLE 3

An epoxy resin component for the two-component epoxy adhesive was prepared by using 400 g of the phenol modified epoxy resin of Example 2A and filling this with 150 g of dry talc, 15 g of fumed silica and 133 g of the prereacted liquid diglycidyl ether of Bisphenol-A with 40% by weight of carboxylic terminated butadiene/acrylonitrile (18% acrylonitrile) Hycar rubber (BF Goodrich product). The degassed material which resulted was used as the epoxy resin component of an adhesive.

EXAMPLE 4

An epoxy resin component for the two-component epoxy adhesive was prepared by using 420 g of modified epoxy resin obtained by the reaction of 394 g of liquid diglycidyl ether of Bisphenol-A (LDGEBP) with 26 g of phenol and blending this with 142 g of the LDGEBP reaction product and 40% by weight of carboxylic-terminated butadiene/acrylonitrile rubber. The liquid was mixed with 7.6 g of tetramethyl xylyl diisocyanate and filled with 189 g of dry talc, 51 g of fumed silica and was degassed.

EXAMPLE 5

An epoxy component was prepared using 90.4 g of liquid diglycidyl ether of Bisphenol-A, 50 g of the epoxy/Hycar product of Example 3, 50.5 g of the modified epoxy resin of Example 2B, 10.2 g of diphenyl carbonate, 14.5 g of fumed silica and 24 g of dry talc.

EXAMPLE 6

A hardener component was made by blending 182 g of poly(propylene oxide)triamine (molecular weight 3000), 53.4 g of poly(propylene oxide)diamine (molecular weight 400), 22.1 g of tris(dimethylaminomethyl)phenol, 25 g of aminoethylpiperazine and 67 g of Bisphenol-A and filled with 195 g of dry talc. The degassed viscous material was used as a hardener component.

EXAMPLE 7

A hardener component was prepared using 72 g of poly(propylene oxide)triamine (molecular weight of 3000), 20 g of poly(propylene oxide) diamine (molecular weight 400), 24 g of Bisphenol-A, 16 g of tris(dimethylaminomethyl)phenol, 70 g of dry talc and 4 g of fumed silica.

EXAMPLE 8

The epoxy component of Example 4 (30 g) and the hardener component of Example 7 (20 g) were mixed to give a non-sagging material. This material was applied on fiberglass reinforced polyester (sheet molding compound) panels according to the procedure described in Example 1 for adhesive testing. Side impact testing samples were also prepared similarly to the lap shear samples, except that the adhesive bond overlap was about ½ inch instead of the one inch overlap in the lap shear procedure. The side impact samples (five) showed fiber tear with average strength of about 30 inch pounds. The lap shear testing results are given in Table 1. Adhesive beads were also made for flexibility testing and were found to have excellent flexibility.

| Sample No. | Test Procedure | Lap Shear Strength (psi)* SMC 1 | Lap Shear Strength (psi)* SMC 2 |
| --- | --- | --- | --- |
| 1  | A | 470 | 495 |
| 2  | A | 532 | 520 |
| 3  | A | 473 | 515 |
| 4  | B | 492 | 360 |
| 5  | B | 457 | 430 |
| 6  | B | 450 | 455 |
| 7  | C | 523 | 460 |
| 8  | C | 464 | 411 |
| 9  | C | 460 | 312 |
| 10 | D | 537 | 415 |
| 11 | D | 500 | 422 |
| 12 | D | 455 | 525 |
| 13 | E | 475 | 469 |
| 14 | E | 530 | 360 |
| 15 | E | 475 | 421 |

*All the lap shear samples resulted in 100% fiber tear.
SMC 1 - Commercial SMC obtained from Budd Corporation (Budd 950).
SMC 2 - Commercial SMC obtained from Diversitech General (GT 7113).

EXAMPLE 9

The epoxy component of Example 5 (30 g) was mixed with 20 g of the hardener of Example 6. The resulting mixture had non-sagging properties. Adhesive test samples were prepared by following the procedure of Example 1 and the test results are given in Table 2.

| Sample No. | Test Procedure | Lap Shear Strength (psi)* |
| --- | --- | --- |
| 1  | A | 640 |
| 2  | A | 590 |
| 3  | A | 645 |
| 4  | B | 745 |
| 5  | B | 590 |
| 6  | B | 584 |
| 7  | C | 656 |
| 8  | C | 547 |
| 9  | C | 432 |
| 10 | D | 485 |
| 11 | D | 470 |
| 12 | D | 510 |

*All the samples showed 100% fiber tear except #9 which showed some adhesive failure.

EXAMPLE 10

The epoxy of Example 3 (30 g) was mixed with the hardener of Example 7 (20 g) and the resulting mixture was tested as an adhesive for SMC in accordance with the procedures of Example 1. All the lap shear testing carried out using Procedure A through D of Example 1 showed near 100% fiber tear in the range of 400 to 660 psi.

I claim:
1. A process for preparing an improved epoxy adhesive composition comprising mixing
    (a) an epoxy resin component containing a polyepoxide resin having more than one group of the formula

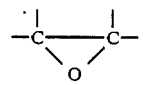

and the partial reaction product of a polyepoxide with phenol, with (b) a hardener component composed of either a primary and secondary amine containing polyamine or a poly amido-amine, and a tertiary amine containing epoxy curing catalyst.

2. The process of claim 1 wherein the partial reaction product in (a) is made from 0.02 to 0.4 equivalents of phenol per equivalent of polyepoxide.

3. The process of claim 2 wherein the polyamine of (b) is poly(propylene oxide) di- or tri-primary amine of molecular weight ranging from 200–10,000 or one selected from the group consisting of ethylene diamine and aminoethyl piperazine.

4. The process of claim 3 wherein the reaction product in (a) is made from a liquid diglycidyl ether of Bisphenol-A and phenol.

5. The process of claim 3 wherein the amount of epoxy curing catalyst used is in the range of from 1–10% be weight based on the weight of the hardener component.

6. The adhesive composition made by the process of claim 1.

7. The process for adhering two or more SMC surfaces to each other comprising placing the adhesive composition of claim 1 between said surfaces and curing the resulting material at a temperature in the range of from about 25° C. to about 200° C.

* * * * *